(12) United States Patent
Chaki et al.

(10) Patent No.: US 10,834,542 B2
(45) Date of Patent: Nov. 10, 2020

(54) METHOD AND SYSTEM FOR INTER-GROUP COMMUNICATION IN A WIRELESS P2P NETWORK

(71) Applicant: NEC Corporation, Tokyo (JP)

(72) Inventors: Prakash Chaki, Tokyo (JP); Masato Yasuda, Tokyo (JP); Kazuaki Nakajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 16/062,753

(22) PCT Filed: Dec. 28, 2015

(86) PCT No.: PCT/JP2015/006493
§ 371 (c)(1),
(2) Date: Jun. 15, 2018

(87) PCT Pub. No.: WO2017/115395
PCT Pub. Date: Jul. 6, 2017

(65) Prior Publication Data
US 2019/0007801 A1    Jan. 3, 2019

(51) Int. Cl.
| H04W 4/08 | (2009.01) |
| H04W 76/10 | (2018.01) |
| H04L 29/08 | (2006.01) |
| H04W 76/23 | (2018.01) |
| H04W 76/14 | (2018.01) |

(Continued)

(52) U.S. Cl.
CPC ............ *H04W 4/08* (2013.01); *H04B 17/318* (2015.01); *H04L 67/1044* (2013.01); *H04W 8/186* (2013.01); *H04W 56/001* (2013.01); *H04W 76/10* (2018.02); *H04W 76/14* (2018.02); *H04W 76/23* (2018.02); *H04W 84/20* (2013.01);

(Continued)

(58) Field of Classification Search
None
See application file for complete search history.

(56) References Cited

U.S. PATENT DOCUMENTS

| 7,035,240 B1 * | 4/2006 | Balakrishnan ........ H04W 84/18 370/338 |
| 2005/0117530 A1 * | 6/2005 | Abraham .......... H04W 52/0232 370/310 |

(Continued)

FOREIGN PATENT DOCUMENTS

| WO | 2006/067922 A1 | 6/2006 |
| WO | 2014/155712 A1 | 10/2014 |
| WO | 2015/062642 A1 | 5/2015 |

OTHER PUBLICATIONS

Wi-Fi Peer-to-Peer (P2P) Technical Specification Version 1.5 (Year: 2014).*

(Continued)

*Primary Examiner* — Jeffrey M Rutkowski
*Assistant Examiner* — Basil Ma

(57) ABSTRACT

A method includes the steps of: disconnecting a first device included in a first P2P group from the first P2P group so that the first device joins to a second P2P group; and in synchronization with the first device switching to the second P2P group, disconnecting a second device included in the second P2P group from the second P2P group so that the second device joins to the first P2P group.

18 Claims, 15 Drawing Sheets

(51) Int. Cl.
  *H04W 84/20* (2009.01)
  *H04W 8/18* (2009.01)
  *H04B 17/318* (2015.01)
  *H04W 56/00* (2009.01)
  *H04M 3/56* (2006.01)
  *H04W 84/12* (2009.01)
  *H04W 84/18* (2009.01)

(52) U.S. Cl.
  CPC .............. *H04M 3/56* (2013.01); *H04W 84/12* (2013.01); *H04W 84/18* (2013.01)

(56) References Cited

U.S. PATENT DOCUMENTS

| | | | | |
|---|---|---|---|---|
| 2005/0213531 A1* | 9/2005 | Nanda | ...................... | H04L 45/04 370/328 |
| 2008/0151801 A1* | 6/2008 | Mizuta | ................ | H04W 52/343 370/311 |
| 2014/0241354 A1* | 8/2014 | Shuman | ................ | H04L 12/281 370/390 |
| 2015/0223046 A1* | 8/2015 | Patil | ...................... | H04W 8/005 370/254 |
| 2015/0264123 A1* | 9/2015 | Smadi | ...................... | H04W 4/12 709/206 |
| 2015/0350374 A1 | 12/2015 | Soneda et al. | | |
| 2018/0206110 A1* | 7/2018 | Chaki | .................. | H04L 45/122 |

OTHER PUBLICATIONS

"Wi-Fi Peer-To-Peer(P2P)Technical Specification Version 1.4", Wi-Fi Alliance, Cited in the Specification.
R.Ferdous et al.,"Trust-based Cluster head Selection Algorithm for Mobile Ad hoc Networks", Trust, Security and Privacy in Computing and Communications (TrustCom), 2011 IEEE 10th International Conference on, Nov. 2011, pp. 589-596, IEEE, Cited in ISR.
International Search Report for PCT Application No. PCT/JP2015/006493, dated Mar. 22, 2016.
Written opinion for PCT Application No. PCT/JP2015/006493.
Japanese Office Action for JP Application No. 2018-529185 dated Apr. 2, 2019 with English Translation.

* cited by examiner

METHOD AND SYSTEM FOR INTER-GROUP COMMUNICATION IN A WIRELESS P2P NETWORK

This application is a National Stage Entry of PCT/JP2015/006493 filed on Dec. 28, 2015, the contents of all of which are incorporated herein by reference, in their entirety.

TECHNICAL FIELD

The present invention generally relates to techniques of communication between devices and in particular to a method, an apparatus and system for inter-group communication in wireless peer-to-peer (P2P) networks.

BACKGROUND ART

In contrast to the traditional infrastructure mode of Wi-Fi, the recently released standard Wi-Fi Peer to peer (P2P), which is also known as Wi-Fi Direct, sheds off the need for a specialized hardware to act as Access Point. Wi-Fi P2P Technical Specification Version 1.4 (NPL1) states the provision that allows any Wi-Fi P2P device to take up the role of P2P Group Owner (analogous to Access Point of Wi-Fi infrastructure mode). Before starting data communication among themselves, a pair of Wi-Fi P2P devices discovers each other and negotiates to decide the device that will act as P2P Group Owner (P2P GO). After that the security keys are exchanged and a Wi-Fi P2P group is established. The P2P GO can then add more devices to its group as P2P Client (analogous to STA in traditional Wi-Fi infrastructure mode). The P2P Clients connect to the P2P GO according to a star topology wherein the P2P GO routes packets from one P2P Client to another. In this disclosure, a Wi-Fi P2P group which has lesser number of P2P Clients than its maximum supportable size (or some other threshold size) has been referred to as an unsaturated group. Alternatively, a Wi-Fi P2P group with group size equal to the maximum supportable size (or, greater or equal to some threshold size) has been referred to as a saturated group.

CITATION LIST

Non Patent Literature

[NPL 1]
Wi-Fi Peer-To-Peer (P2P) Technical Specification Version 1.4

SUMMARY

Technical Problem

Wi-Fi Direct operates in a group structure, where one node assumes the role of the leader (called Group Owner or P2P GO in Wi-Fi P2P terminology) and other group members stay connected to the GO as P2P Clients. Peer to peer communication in Wi-Fi Direct is defined within the group. Accordingly, content delivery to a large number of nodes in a wide area using Wi-Fi Direct is a technical challenge as a large gathering of Wi-Fi P2P devices would result into several isolated Wi-Fi P2P group formations, requiring communication outside the group.

Inter-group communication in multi-group P2P network may be facilitated by concurrent operation. In concurrent operation, a node can maintain simultaneous connections with more than one group by using multiple physical or virtual radio interfaces. Thus, a node performing concurrent operation may route packets from one P2P group to another P2P group which enables inter-group communication. However, the concurrent operation requires a device to support multiple physical or virtual Medium Access Control (MAC) interfaces. Such multiple physical or virtual MAC interfaces may not be supported by all devices. However, communication outside the group is not possible using a single physical/logical MAC entity. Accordingly, it is a technical challenge for nodes in one Wi-Fi P2P group to perform inter-group communication using a single physical or logical MAC interface.

An object of the present invention is to provide a mechanism which can achieve inter-group communication in a multi-group Wi-Fi P2P network.

Solution to Problem

According to the present invention, a method of operating a wireless peer-to-peer (P2P) network including a plurality of P2P groups, comprising: disconnecting a first device included in a first P2P group from the first P2P group so that the first device joins to a second P2P group; and in synchronization with the first device switching to the second P2P group, disconnecting a second device included in the second P2P group from the second P2P group so that the second device joins to the first P2P group.

According to the present invention, a system for operating a wireless peer-to-peer (P2P) network including a plurality of P2P groups, wherein a first device included in a first P2P group disconnects from the first P2P group so that the first device joins to a second P2P group; and a second device included in the second P2P group, in synchronization with the first device switching to the second P2P group, disconnects from the second P2P group so that the second device joins to the first P2P group.

Advantageous Effects of Invention

According to the present invention, inter-group message transfer will be possible in a multi-group wireless P2P network with synchronized switching between multiple switching devices.

In addition, other obvious and apparent advantages of the invention will be reflected from the detailed specification and drawings.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

DETAILED DESCRIPTION

Figure 1:
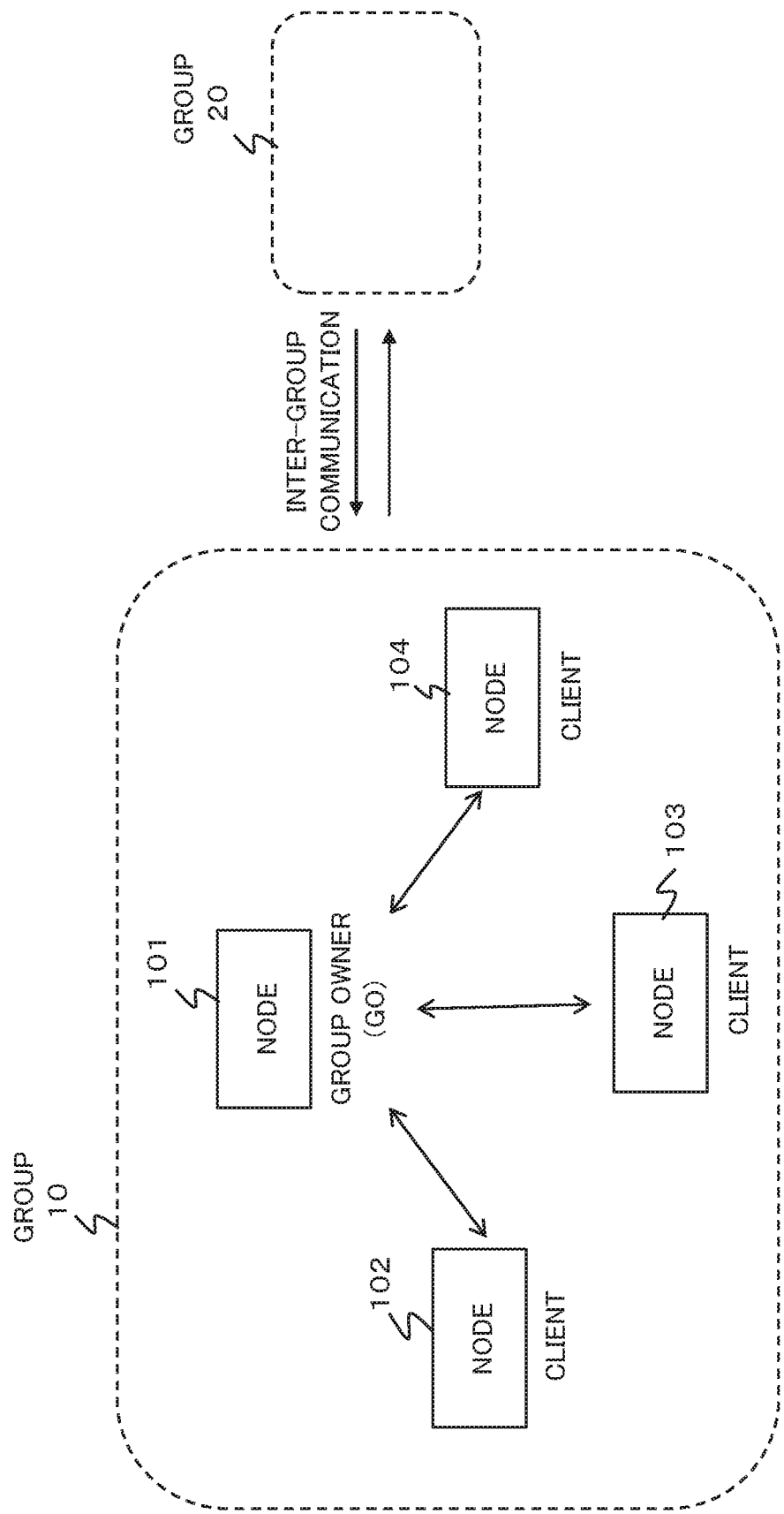
FIG. 1 is a schematic diagram showing an example of a wireless peer-to-peer (P2P) group in order to describe inter-group communication according to exemplary embodiments of the present invention.

Hereinafter, the word "exemplary" is used herein to mean "serving as an example, instance or illustration". Any embodiment described herein as "exemplary" is not necessarily to be construed as preferred or advantageous over other embodiments.

1. Outline of Exemplary Embodiments

The technical problems as discussed above can be solved by one or many variants of the exemplary embodiments. Specifically, the disclosure introduces a synchronized switching mechanism of multiple switching devices between different groups.

Switching mechanism can be used for inter-group message transfer even if devices support a single MAC interface. In switching operation, the inter-group message transfer may be achieved by disconnecting a P2P client device from a first P2P group, connecting to a second P2P group to transfer data packets, and then returning back to the first group. Thus, by iterative switching operation which may be performed by repeated connection and disconnection between two or more P2P groups, message can be continuously shared between a pair of P2P groups.

1.1) First Exemplary Embodiment

Inter-group communication according to a first exemplary embodiment of the present invention may use a mechanism wherein a device which is a client of a first P2P group is selected as a switching device to perform the switching operation between the first P2P group and the second P2P group. The first switching device disconnects from the first P2P group and sends a connection request to the group owner device of the second P2P group. On receiving the connection request from the first switching device, the P2P group owner device of the second P2P group instructs a client of the second P2P group to immediately disconnect its client as a switching device from the second P2P group and instructs it to join the first P2P group. When the group owner device of the second P2P group accepts the connection request of the first switching device and the group owner device of the first P2P group accepts the connection request of the second switching device, the first switching device performs message exchange within the second P2P group and the second switching group performs message exchange within the first P2P group.

After some time, the first switching device disconnects from the second P2P group and sends a connection request to the first P2P group. On receiving the connection request from the first switching device, the P2P group owner device of the first P2P group immediately disconnects the second switching device from the first P2P group and instructs it to join the second P2P group.

As described above, a tight synchronization can be achieved between the first and second switching devices. Also, such synchronization may be managed by only one of the first and second switching devices. In the example described above, the first switching device triggers the switching event of the second switching device. Thus the first switching device acts as the triggering device and the second switching device acts as the triggered device. The number of switching events per unit interval of time can be managed by the triggering device; the triggered device would follow the trigger from the triggering device and switch accordingly.

1.2) Second Exemplary Embodiment

Inter-group communication according to a second exemplary embodiment of the present invention may use multiple pairs of triggering-triggered switching devices between a first P2P group and a second P2P group. Each pair of triggering-triggered switching devices may operate independently of each other. Thus, a first pair of triggering-triggered switching devices may perform switching at a specific switching frequency (number of switching events happening in per unit interval of time) and a second pair of triggering-triggered switching devices may perform switching at a different switching frequency.

1.3) Third Exemplary Embodiment

Inter-group communication according to a third exemplary embodiment of the present invention may use multiple pairs of triggering-triggered switching devices between a first P2P group and a second P2P group. Each pair of triggering-triggered switching devices may operate in synchronization with each other. For instance, a first pair of triggering-triggered switching devices performs one switching event and a second pair of triggering-triggered switching devices is instructed to perform the next switching event between a pair of P2P groups. The schedule of switching for each triggering-triggered pair may be prepared by the P2P group owner of one of the first or second P2P groups.

In the above-described embodiments, the first switching device may share the security credential of the first P2P group with the second P2P group such that the second switching device can use the credential to join the first P2P group. The first switching device may share the security credential of the first P2P group with the second P2P group in the connection request from first switching device to the second P2P group owner device. The credential may be shared by the P2P group owner device of the second P2P group with the second switching device. The second switching device may then use the credential to connect to the group owner device of the first P2P group.

1.5) Advantageous Effects

As described above, according to the exemplary embodiments of the present invention, it will be possible to transfer messages between multiple P2P groups. Such inter-group message transfer can be achieved by switching devices which may switch connection between a first P2P group and a second P2P group. According to the disclosed exemplary embodiments, it will be possible to achieve tight synchronization between a first switching device from the first P2P group and a second switching device from the second P2P group. Such tight synchronization may be useful especially in case of switching among saturated groups. A saturated group has the maximum number of clients that can be supported in that group, thus accepting a new connection is not possible for the P2P group owner device unless the P2P group owner device disconnects one of the existing clients. Thus a triggering switching device from a first P2P group would trigger the P2P group owner device of the second P2P group to disconnect a second switching device from the second P2P group. The process repeats in a cyclic and synchronized manner such that the triggering and triggered switching devices never connect to the same group at the same time. In addition, multiple such triggering-triggered pairs of switching devices may be used between a pair of P2P groups, independently or following a schedule.

2. System Configuration

Hereinafter, exemplary embodiments of the present invention will be described taking a system based on W-Fi Direct Standard as an example. The exemplary embodiments are discussed in its complete details with accompanying figures and finally explained with a typical example scenario.

Referring to FIG. 1, it is assumed that exemplary Wi-Fi Direct groups 10 and 20 are operating in each other's transmission range. The group 10 includes a plurality of nodes 101-104, wherein the node 101 operates as a Group Owner (GO) and other nodes 102, 103 and 104 operate as associated Clients, respectively. Once the group 10 is formed, the GO node 101 may play a role analogous to that of an access point in a Wi-Fi infrastructure mode operation. The group 20 also includes a plurality of nodes composed of a GO node and Client nodes. The GO nodes and selected Client nodes in the groups 10 and 20 are capable of performing inter-group communication according to the exemplary embodiments, which will be described later.

Figure 2:
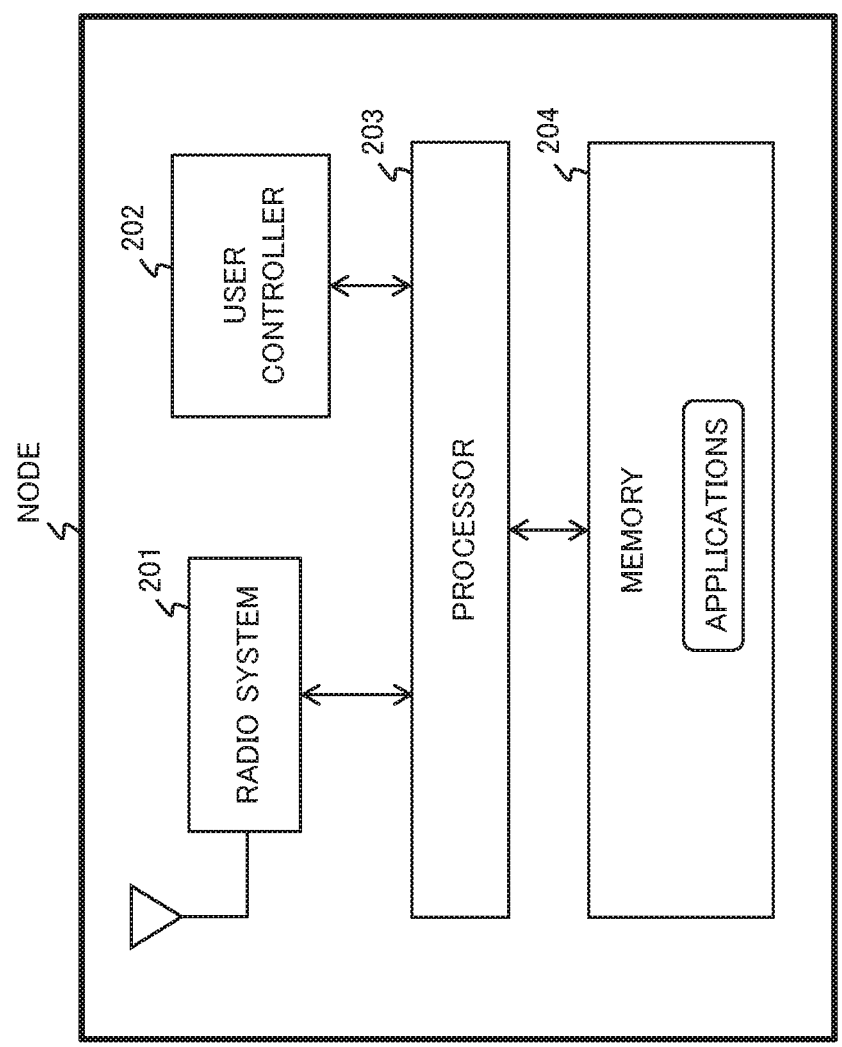
FIG. 2 is a block diagram showing the functional configuration of a node according to the exemplary embodiments of the present invention.

Referring to FIG. 2, a node is composed of a radio communication device capable of performing communications in a Peer to Peer group according to one or more exemplary embodiments of the present invention. It represents any one of the nodes included in the groups 10 and 20. In various implementations, the radio communication device may be a personal computing device (e.g., smart phone, computing tablet, personal computer, laptop computer, Personal Digital Assistant (PDA), etc.). The nodes 101~104 have the same configuration but may operate as GO or Client. The node includes the following functionalities: a radio system 201, a user controller 202, a processor 203 and a memory 204. The radio system 201 includes a Wi-Fi Direct communication function. The user controller 202 controls Wi-Fi Direct connection procedures such as Device Discovery, GO Negotiation, Provisional Service Discovery and Invitation Mechanism etc. The processor 203 can execute the operating system and applications stored in the memory 204 or a separate storage device such as a semiconductor memory according to the present embodiment. The processor 203 controls the operations of the node including GO operation, Client operation and a switching device used for inter-group communication according to the exemplary embodiments.

The memory 204 may include a system memory component (e.g, RAM), a static storage component (e.g., ROM), and/or a disk drive. The node performs specific operations by processor 203 and other components by executing one or more sequences of instructions contained in the system memory component. Logic may be encoded in a computer readable medium, which may refer to any medium that participates in providing instructions to processor 203 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component, and transmission media includes coaxial cables, copper wire, and fiber optics, including wires that comprise bus. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, Compact Disc (CD) Read-Only Memory (ROM), any other optical medium, punch cards, paper tape, any other physical medium with patterns of holes, Random-Access Memory (RAM), Programmable ROM (PROM), Electrically Erasable Programmable ROM (EEPROM), FLASH-EEPROM, any other memory chip or cartridge, or any other medium from which a computer is adapted to read.

3. First Exemplary Embodiment

Referring to FIGS. 3-12, inter-group data transfer according to the first exemplary embodiment of the present invention will be described in details.

3.1) System Operation

Figure 3:
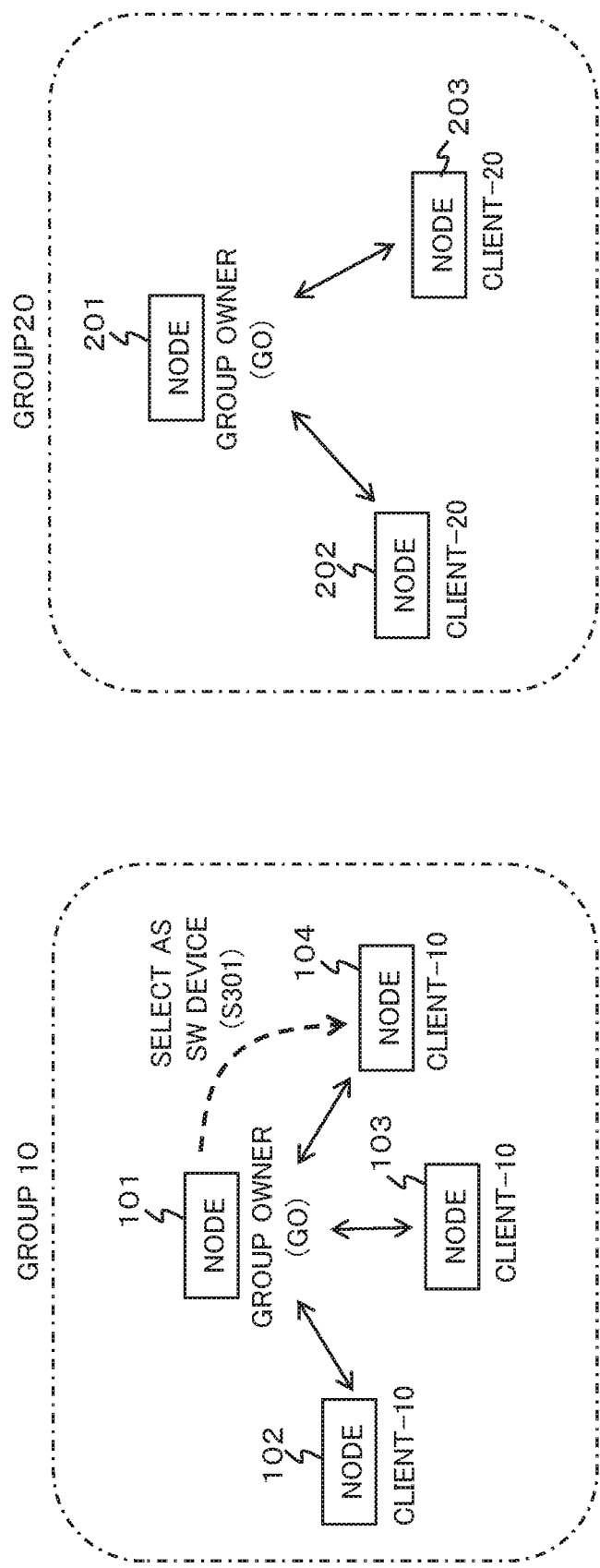
FIG. 3 is a diagram showing two wireless P2P groups operating in each other's transmission range for explaining inter-group communication according to a first exemplary embodiment of the present invention.

As illustrated in FIG. 3, it is assumed that two Wi-Fi P2P groups 10 and 20 are operating in each other's transmission range. Node 101 is the P2P GO of group 10. Node 102, 103 and 104 are P2P Clients of group 10 which are connected to the P2P GO 101. Node 201 is the P2P GO of group 20. Node 202 and 203 are P2P Clients of group 20 which are connected to the P2P GO 201. To enable inter-group communication between the P2P group 10 and the P2P group 20, the node 104 of the P2P group 10 may be selected as a first switching device to switch connection between the P2P groups 10 and 20 (Operation S301). Node 104 can be selected as a switching device among all nodes in the P2P group 10 according to a criterion including, but not limited to, at least one of:

1. Node 104 receives the highest Received Signal Strength Indicator (RSSI) from the P2P GO node 201 of the P2P group 20.
2. Node 104 meets at least one of predefined criteria on memory, CPU speed, residual power, time to stay in the network etc.
3. Node 104 is not performing switching with any other neighboring group.
4. Node 104 is the node with minimum average packet exchange (packet sending and receiving) among all nodes in the P2P group 10.

Figure 4:
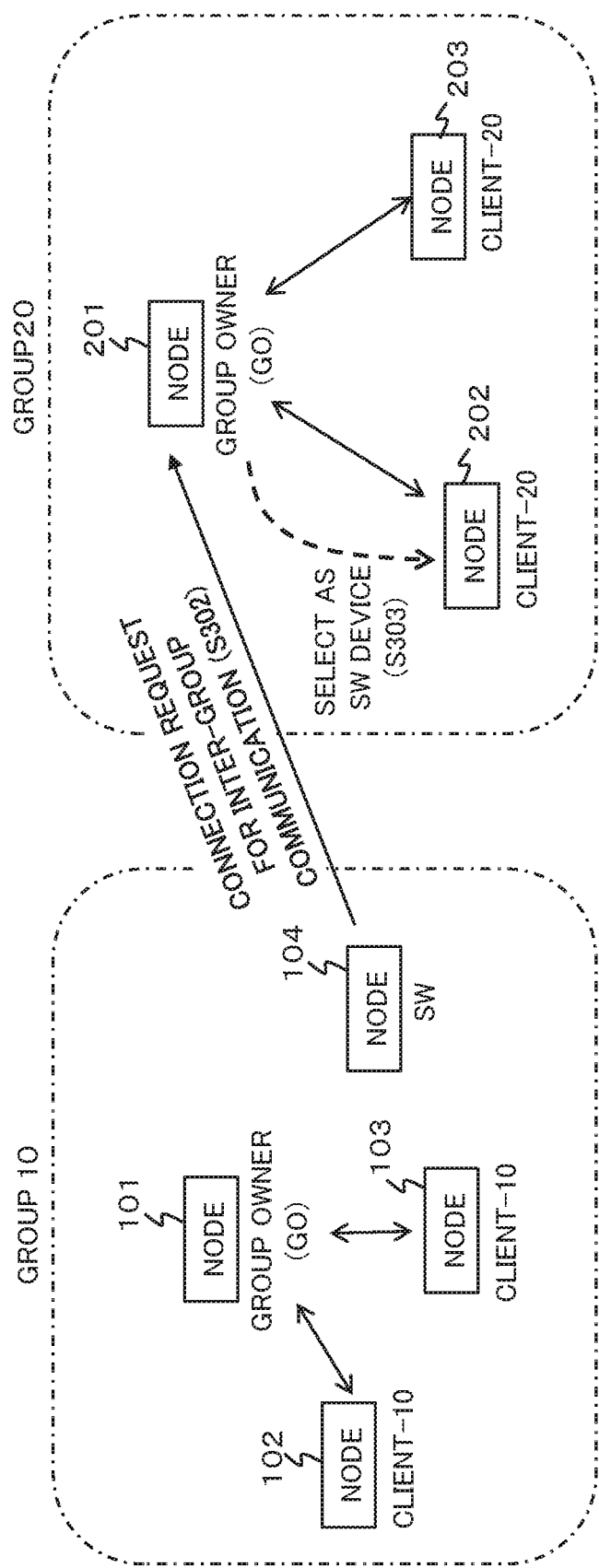
FIG. 4 is a diagram illustrating the operation of triggering-triggered mechanism for explaining inter-group communication according to the first exemplary embodiment of the present invention.

Referring to FIG. 4, the selected node 104 as the first switching device disconnects from the P2P GO 101 of P2P group 10 and sends a connection request for inter-group communication to the P2P GO 201 of P2P group 20 (Operation S302). The connection request may include some specific information so as to inform the P2P GO 201 that it is a connection request for inter-group communication. Such specific information may include at least one of the P2P group 10's identification number, GO 101's identification number or some flag bit indicating that it is an inter-group switching node. Such information may be included in the Vendor Specific Attribute field of the connection request. Alternatively, it is possible for the P2P GO 101 to inform the P2P GO 201 about the impending inter-group connection request from the node 104.

When receiving the connection request from the first switching device 104, the P2P GO 201 selects one of Client nodes of the P2P group 20 as a second switching device. When the node 202 is selected as the second switching device, the P2P GO 201 instructs the second switching device 202 to join the group 10 (Operation 303). Then, the P2P GO 201 disconnects the second switching device 202 and accepts the connection request of the first switching device 104. Alternatively, the P2P GO 201 may ask the node 202 to disconnect from the P2P GO 201. In another variant, it is also possible that the P2P GO 201 first accepts the connection request from the first switching device 104 and then disconnects the second switching device 202.

One possible implementation using wpa_supplicant v2.3 which is a Wi-Fi Direct implementation for Linux Operating System will be described. The P2P Client node 104 which may be using an interface named "wlan0" may use a command "p2p_group_remove wlan0" to disconnect from the P2P GO node 101 of the P2P group 10. After disconnecting from the group 10, the node 104 may perform P2P Device Discovery to find the P2P GO 201 of P2P group 20 using a command "p2p_find". However, there can be instances when the node 104 may not perform P2P Device Discovery. After that, the node 104 may use a command "p2p_connect" to send a connection request to the P2P GO 201 by including the necessary information for switching in the vendor specific attribute. One example of inclusion of information may be done by modifying the configuration file of Wi-Fi Direct. However, there can be other methods for including information in the connection request from node 104; the present invention does not limit to any single method and should be construed to include any such method. If the security credential of the P2P group 20 is known to the node 104, it may also use a command like "p2p_invite" to connect to the P2P GO 201 by using persistent mechanism.

The reception of the connection request by the P2P GO 201 from the node 104 may act as a trigger to disconnect the node 202. When the P2P GO 201 receives the connection request from node 104 (assuming "p2p_connect" is used at node 104) according to the exemplary implementation described above, it may be seen as an event message "P2P-PROV-DISC-PBC-REQ" if push-button control (PBC) method is used. P2P GO 201 may accept the connection request using a command "wps_pbc any"; then an event message "AP-STA-CONNECTED" may be seen at P2P GO 201. In case "p2p_invite" is used by node 104 to connect to P2P GO 201 by using persistent mechanism, then the event message "AP-STA-CONNECTED" may be seen at P2P GO 201 after connection establishment with node 104. After this event message is seen, the P2P GO 201 may ask the node 202 to disconnect. In a similar fashion as explained before, the node 202 may also use a command "p2p_group_remove wlan0" to disconnect from the P2P GO node 201 of P2P group 20. After disconnecting from group 20, the node 202 may or may not perform P2P Device Discovery to find the P2P GO 101 of P2P group 10. As explained earlier, the node 202 may also use a command "p2p_connect" to send connection request to the P2P GO 101 by including the necessary information for switching in the vendor specific attribute. Alternatively, the node 202 may use the command "p2p_invite" to connect to P2P GO 101 by persistent mechanism.

After connecting to the P2P GO 201, the node 104 may exchange data with at least one node of P2P group 20. Similarly, after connecting to the P2P GO 101, the node 202 may exchange data with at least one node in P2P group 10 and wait for the trigger to switch back to the P2P group 20. It may be noted that the node 202 may stay connected to the P2P group 10 as long as there is no trigger from the triggering node 104. The node 104 may start a timer right after joining the P2P group 20; when timeout happens, the node 104 may disconnect from the P2P GO 201 using the command "p2p_group_remove wlan0" and send a connection request to the P2P GO 101 by using at least one of the commands "p2p_connect" or "p2p_invite". As explained before, on receiving at least one of the event message "P2P-PROV-DISC-PBC-REQ" or "AP-STA-CONNECTED" with the node 104, the P2P GO 101 may instruct the node 202 to disconnect and switch back to the P2P group 20. Thus, the process may repeat iteratively.

The switching mechanism can be controlled solely by controlling the triggering node; the triggered node only waits for the trigger and acts accordingly. Thus synchronization is achieved in the switching process in a simple yet effective manner. It may be noted that when connecting using "p2p_invite" by persistent mechanism, the connection establishment time will be reduced as compared to connecting by "p2p_connect" because the credentials are re-used in persistent mechanism. The description in this paragraph is merely one example of implementation, various commands in wpa_supplicant and wpa_cli may be used in many other combinations to achieve the same objective.

Figure 5:
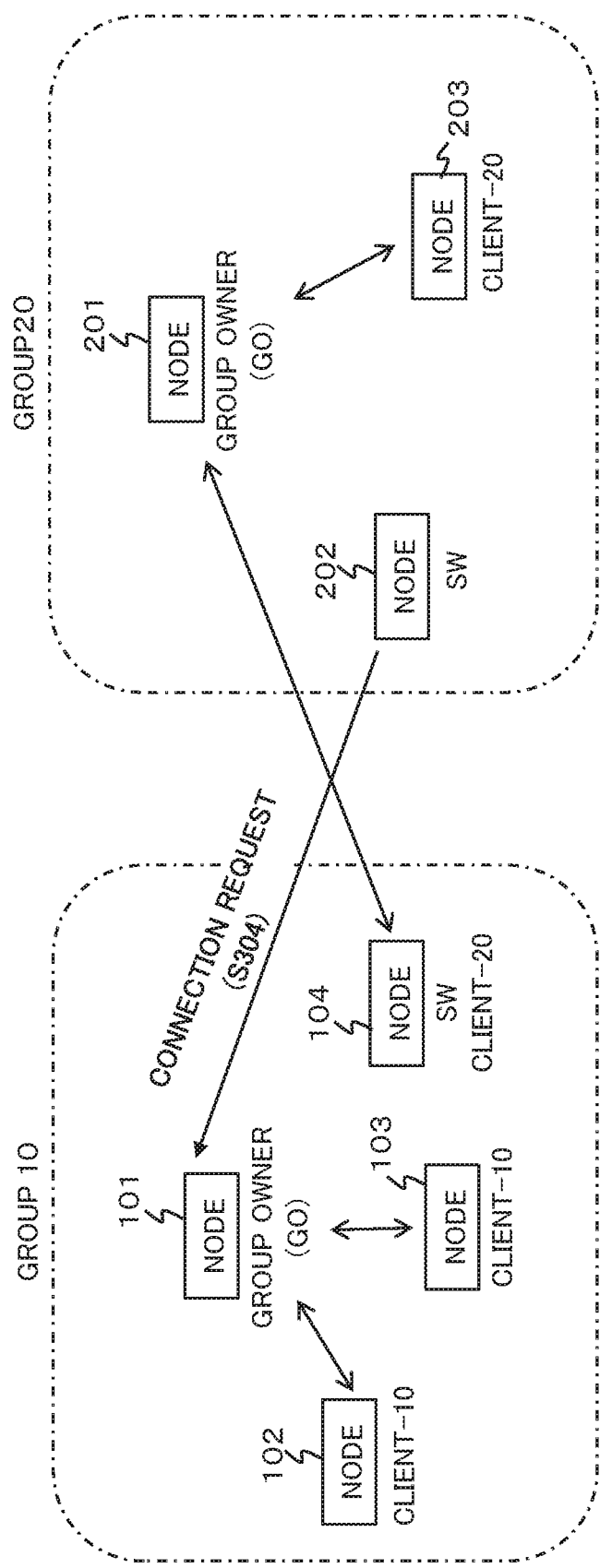
FIG. 5 is a diagram illustrating the operation of triggering-triggered mechanism for explaining inter-group communication according to the first exemplary embodiment of the present invention.

Referring to FIG. 5, after disconnecting from the P2P GO 201, the second switching device 202 sends a connection request to the P2P GO 101 and joins the P2P group 10 (Operation S304). Thus the second switching device 202 is triggered to leave the group 20 and switches to the group 10 when the first switching device 104 sends the connection request to the P2P GO 201 of P2P group 20.

Figure 6:
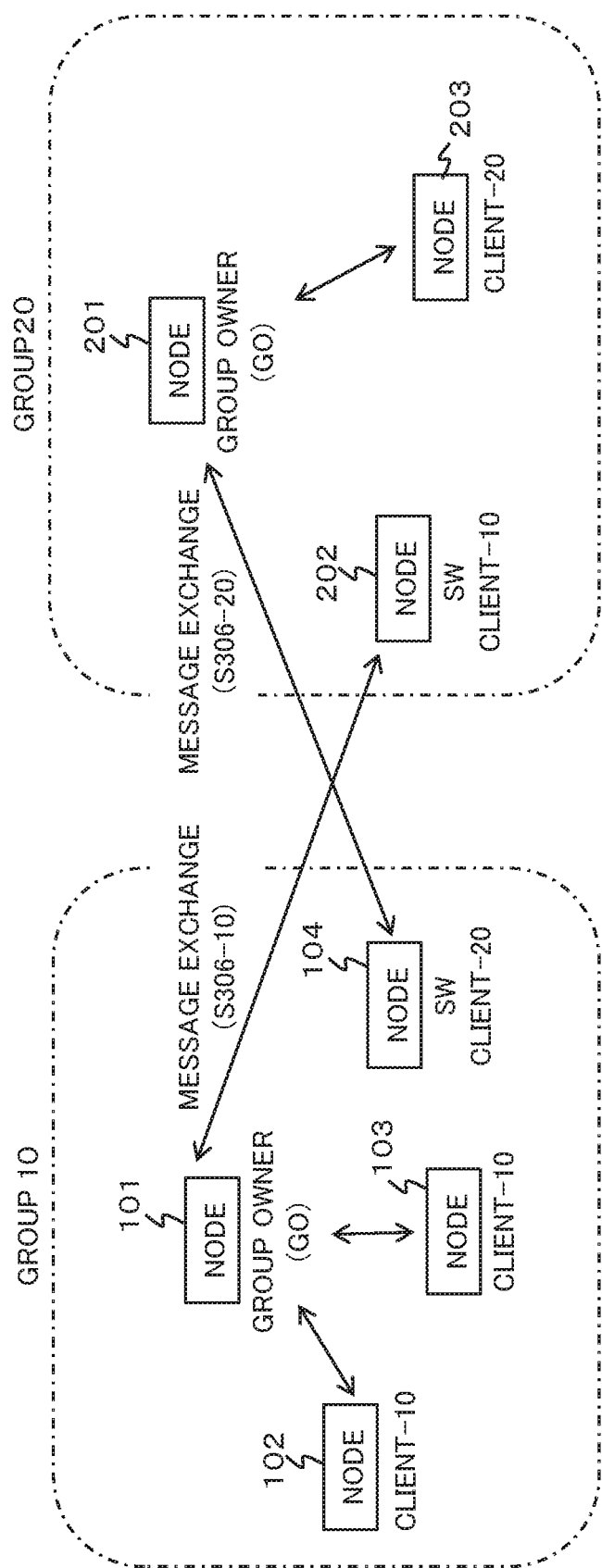
FIG. 6 is a diagram illustrating the operation of triggering-triggered mechanism for explaining inter-group communication according to the first exemplary embodiment of the present invention.

Referring to FIG. 6, the first switching device 104 connects to the P2P GO 201 of P2P group 20 and the second switching device 202 connects to the P2P GO 101 of P2P group 10. After connecting to the P2P GO 201, the first switching device 104 can exchange data with at least one node of the P2P group 20 (Operation S306-20). Similarly, after connecting to the P2P GO 101, the second switching device 202 can exchange data with at least one node of the P2P group 10 (Operation S306-10).

Figure 7:
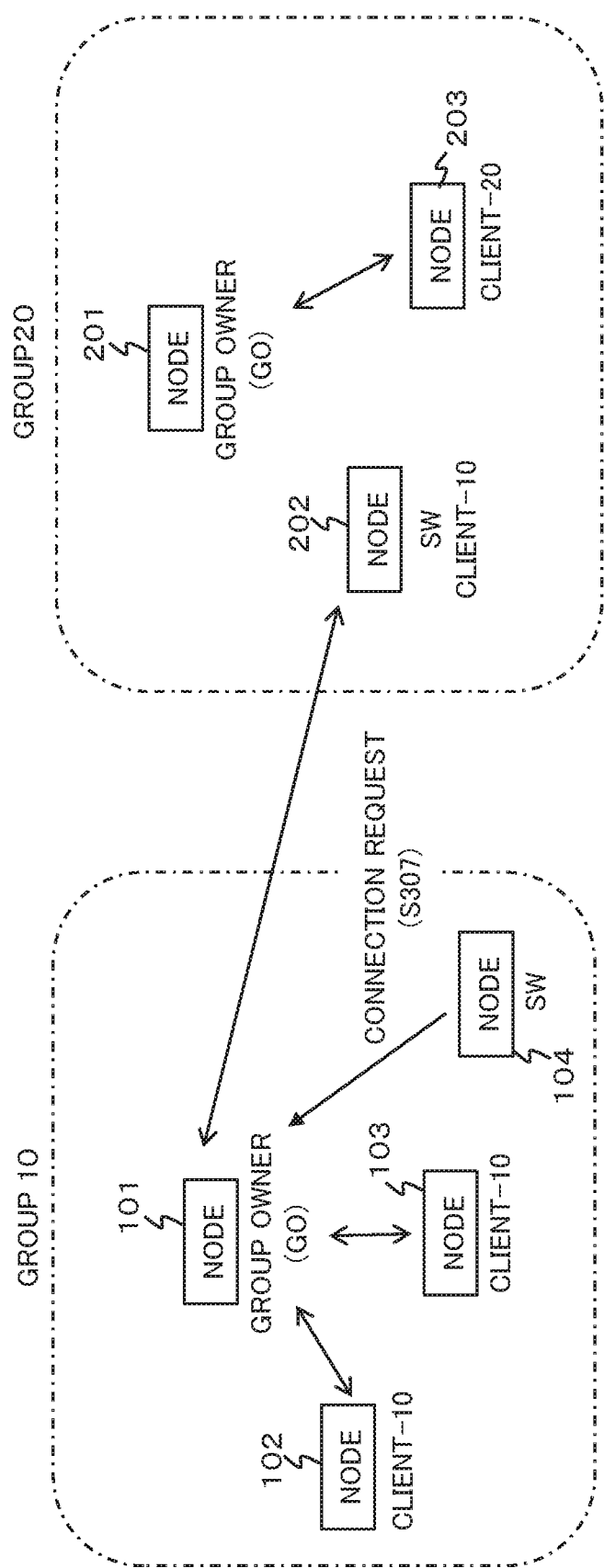
FIG. 7 is a diagram illustrating the operation of triggering-triggered mechanism for explaining inter-group communication according to the first exemplary embodiment of the present invention.

Referring to FIG. 7, after some time interval, the first switching device 104 disconnects from the P2P GO 201 and sends a connection request to the P2P GO 101 (Operation S307). After receiving the connection request from the first switching device 104, the P2P GO 101 instructs the second switching device 202 to join the P2P group 20 and subsequently disconnects it. Alternatively, the second switching device 202 may disconnect from the P2P GO 101 by itself.

Figure 8:
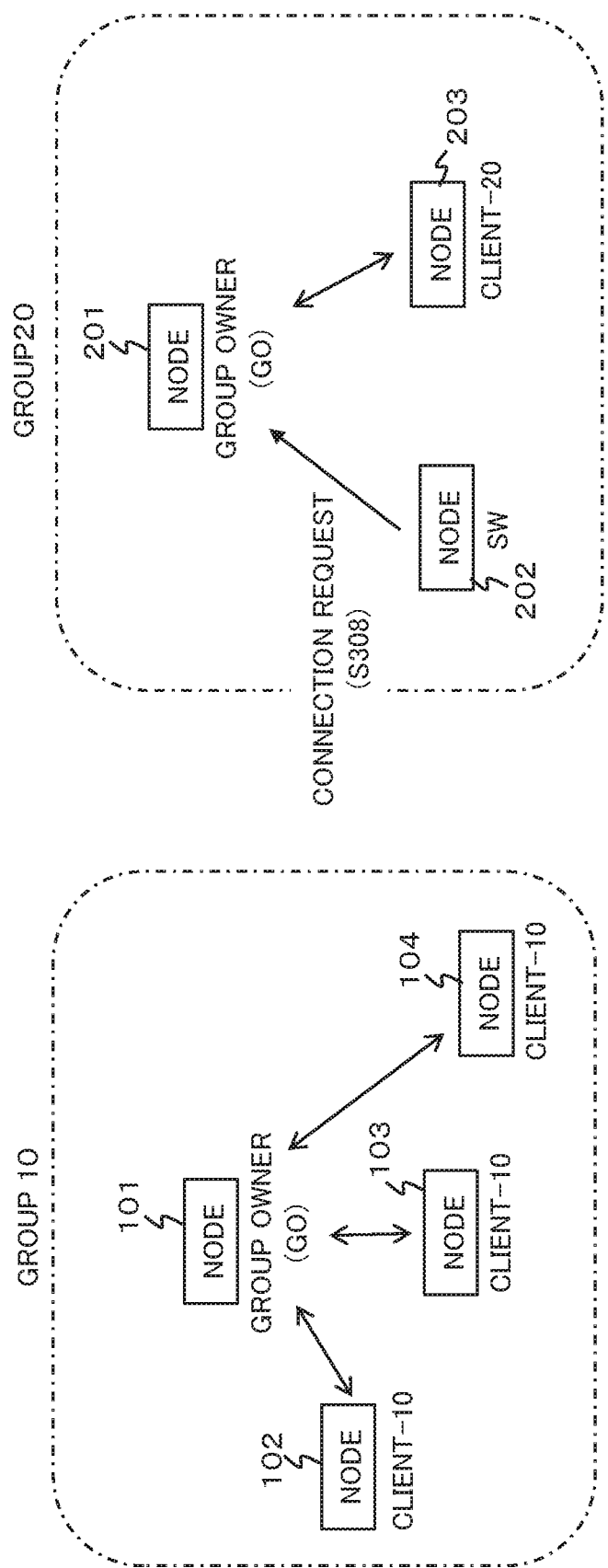
FIG. 8 is a diagram illustrating the operation of triggering-triggered mechanism for explaining inter-group communication according to the first exemplary embodiment of the present invention.

Referring to FIG. 8, the P2P GO 101 accepts the connection request from the first switching device 104. After having disconnected from the P2P GO 101 of the P2P group 10, the second switching device 202 sends a connection request to the P2P GO 201 of P2P group 20 (Operation S308). Thus, the first switching device 104 triggers the switching of the second switching device 202. Hence, the first switching device 104 acts as the triggering switching device and the second switching device 202 is the triggered switching device in this example. The triggering switching device may increase or decrease the number of switching in per unit interval of time. The triggered switching device only waits for the trigger and switches accordingly. Thus the tight synchronization is achieved between the first and second switching devices 104 and 202. Also, with two devices switching together, higher amount of data can be shared between the first P2P group 10 and the second P2P group 20.

Figure 9:
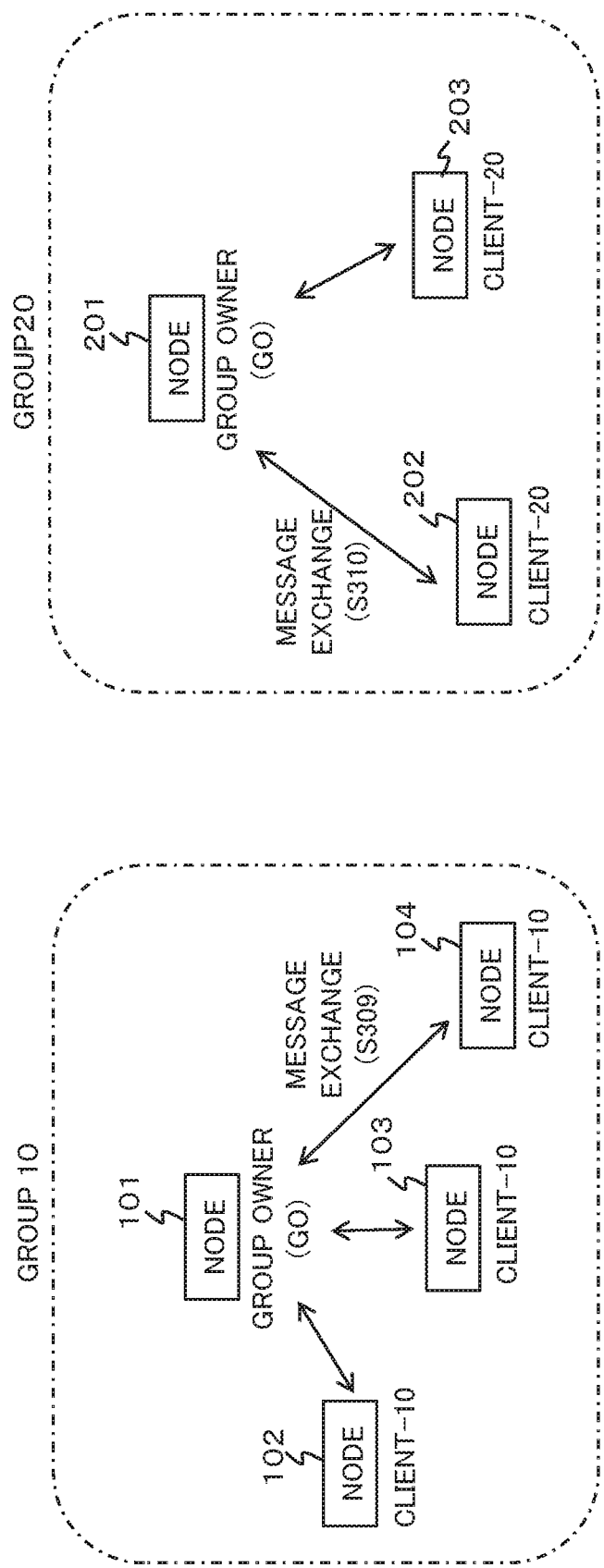
FIG. 9 is a diagram illustrating the operation of triggering-triggered mechanism for explaining inter-group communication according to the first exemplary embodiment of the present invention.

Referring to FIG. 9, when the P2P GO 101 accepts the connection request from the first switching device 104 and the P2P GO 201 accepts the connection request from the second switching device 202, the first switching device 104 can exchange messages with at least one device in the P2P group 10 (Operation S309) and the second switching device 202 can exchange messages with at least one device in the P2P group 20 (Operation S310).

Figure 10:
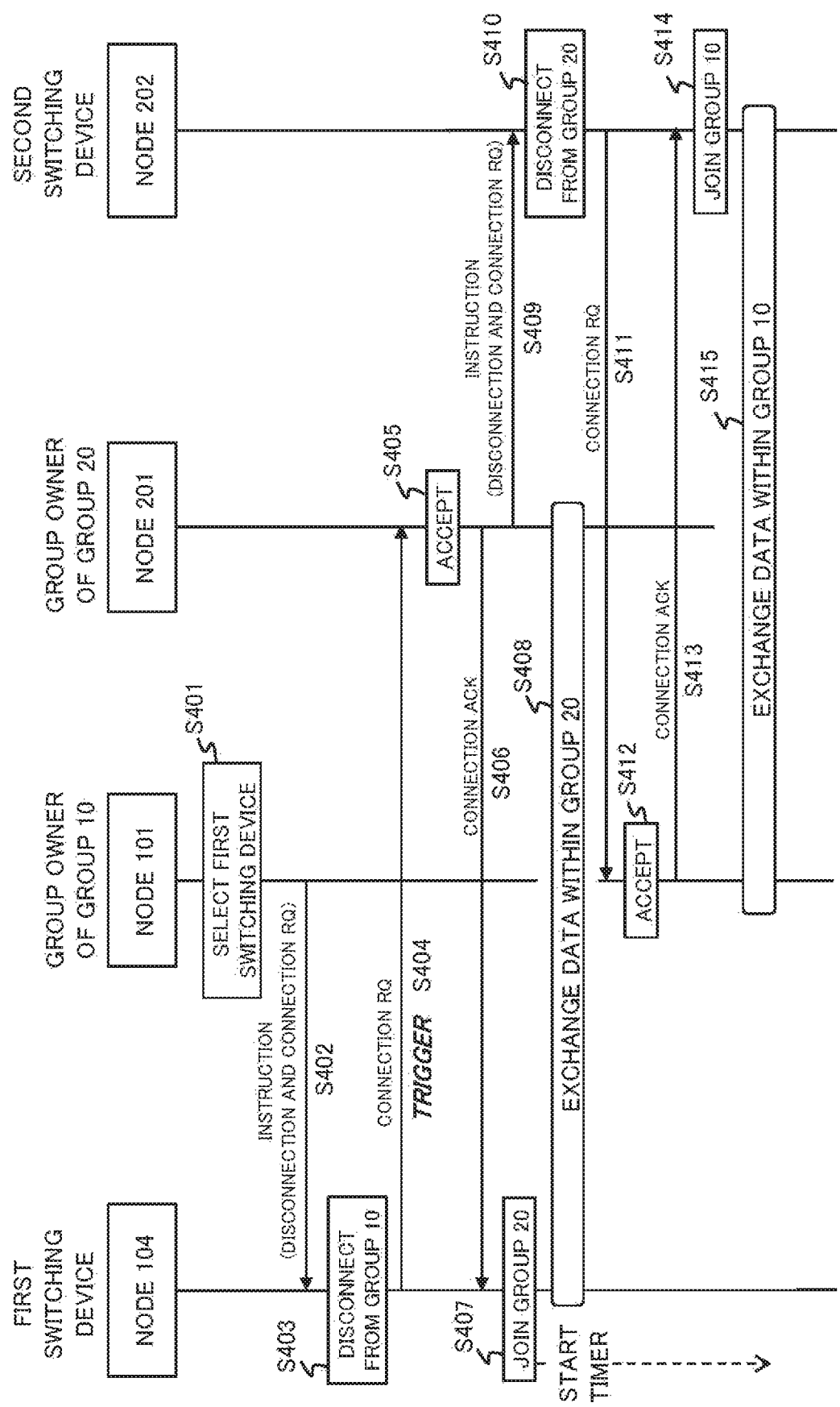
FIG. 10 is a sequence diagram showing the node switching operations of the triggering-triggered mechanism in the inter-group communication according to the first exemplary embodiment of the present invention.
Figure 11:
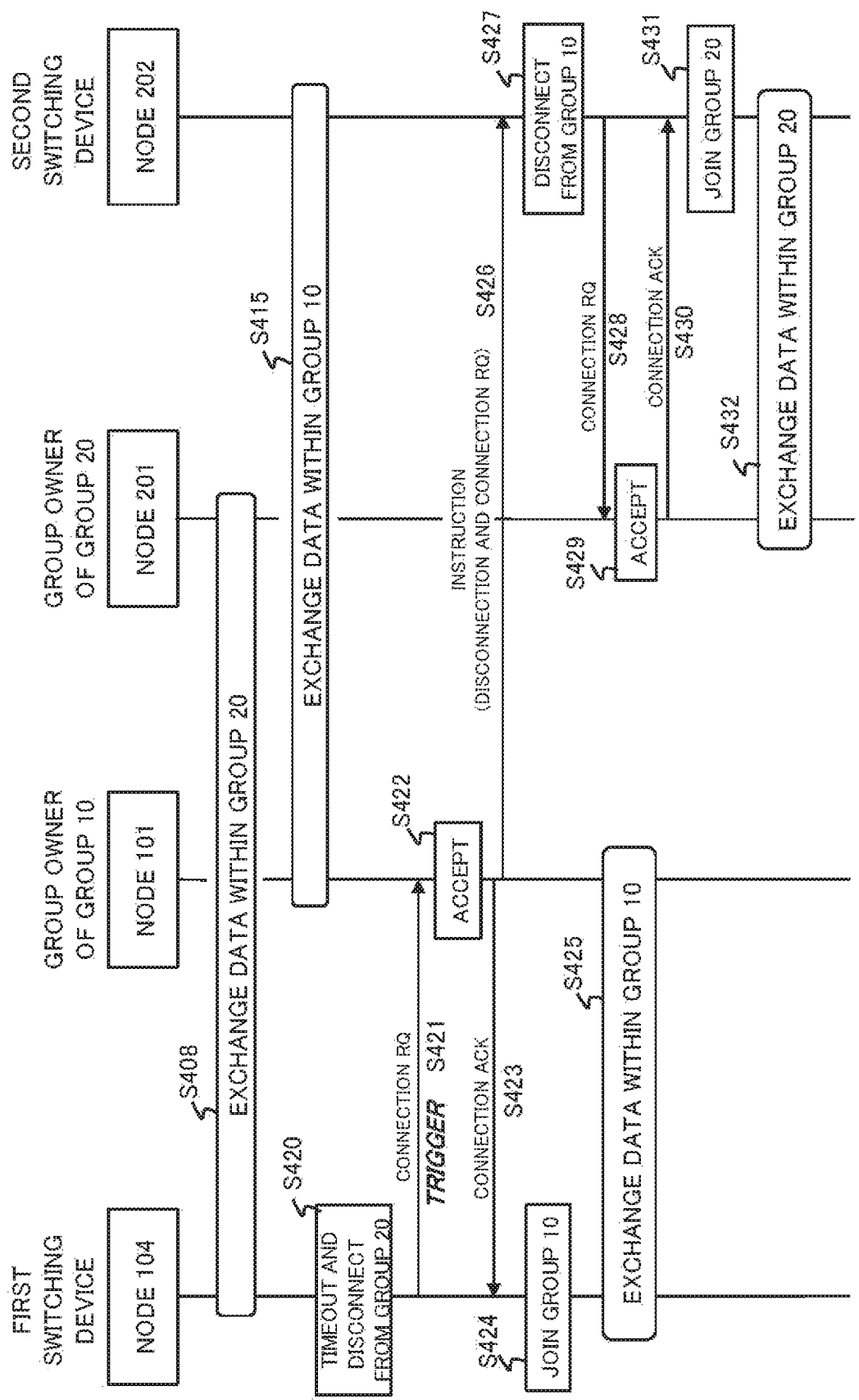
FIG. 11 is a sequence diagram showing the node return switching operations of the triggering-triggered mechanism in the inter-group communication according to the first exemplary embodiment of the present invention.

FIGS. 10 and 11 show an exemplary sequence of the operations as described in FIGS. 3-9. Accordingly, the sequence will be described briefly.

Referring to FIG. 10, in the case where the node 104 of the group 10 is selected as a first switching device to switch (Operation S401), the GO node 101 may instruct the selected node 104 to disconnect from the group 10 and connect to the GO node 201 of the group 20 (Operation S402). According to the instruction, the node 104 disconnects from the group 10 (Operation S403) and sends a connection request as a trigger to the GO node 201 of the group 20 (Operation S404). The connection request from the first switching device (node 104) triggers the GO node 201 to start inter-group communication procedure. More specifically, when receiving the connection request from the node 104 (first switching device), the GO 201 accepts it, sends acknowledgement back to the node 104 (Operations S405 and S406). When receiving the connection acknowledgement, the first switching device (node 104) joins the group 20 (Operation S407) and starts a disconnection timer, which allows the node 104 to exchange data within the group 20 (Operation S408). Paralleling the joining operations of the first switching device (node 104) in the group 20, the GO node 201 selects the node 202 as a second switching device which is one of its client nodes of the group 20 and instructs the selected node 202 to disconnect the group 20 and to join the group 10 (Operation S409). According to the instruction, the node 202 disconnects from the group 20 (Operation S410) and sends a connection request to the GO node 101 of the group 10 (Operation S411). The GO 101 accepts it, sends acknowledgement back to the node 202 (Operations S412 and S413). When receiving the connection acknowledgement, the second switching device (node 202) joins the group 10 (Operation S414), which allows the node 202 to exchange data within the group 10 (Operation S415). In another variant, it is also possible that the GO node 201 may perform the disconnect operation S410 before the accept operation S405.

Referring to FIG. 11, when a timeout occurs after the first switching device (node 104) joins the group 10, the first switching device (node 104) disconnects from the GO node 201 (Operation S420) and sends a connection request as a trigger to the GO node 101 of the group 10 (Operation S421). The connection request from the first switching device (node 104) triggers the GO node 101 to start a switchover procedure between the first and second switching devices. More specifically, when receiving the connection request from the node 104 (first switching device), the GO 101 accepts it, sends acknowledgement back to the node 104 (Operations S422 and S423). When receiving the connection acknowledgement, the first switching device (node 104) connects back to the group 10 (Operation S424), which allows the node 104 to exchange data within the group 10 (Operation S425). Paralleling the joining operations of the first switching device (node 104) in the group 10, the GO node 101 instructs the second switching device (node 202) to disconnect the group 10 and to join the group 20 (Operation S426). According to the instruction, the second switching device (node 202) disconnects from the group 10 (Operation S427) and sends a connection request to the GO node 201 of the group 20 (Operation S428). The GO 201 accepts it, sends acknowledgement back to the node 202 (Operations S429 and S430). When receiving the connection acknowledgement, the second switching device (node 202) connects back to the group 20 (Operation S431), which allows the node 202 to exchange data within the group 20 (Operation S432).

As described above, the first switching device (node 104) triggers device (client node) swapping for inter-group communication, ensuring synchronization between the first and second switching devices. Next, synchronization between switching devices will be described by referring FIG. 12.

3.2) Synchronization Between Switching Devices

Taking the network configuration shown in FIG. 3 and the sequence shown in FIGS. 10 and 11 as an example, a mechanism of synchronization between a first switching device belonging to a first P2P group and a second switching device belonging to a second P2P group will be described with reference to FIG. 12. Initially, the node 104 is connected to the first P2P group 10 and the node 202 is connected to the second P2P group 20. In this example, it is assumed that the node 104 is the triggering switching device and the node 202 is the triggered switching device.

Figure 12:
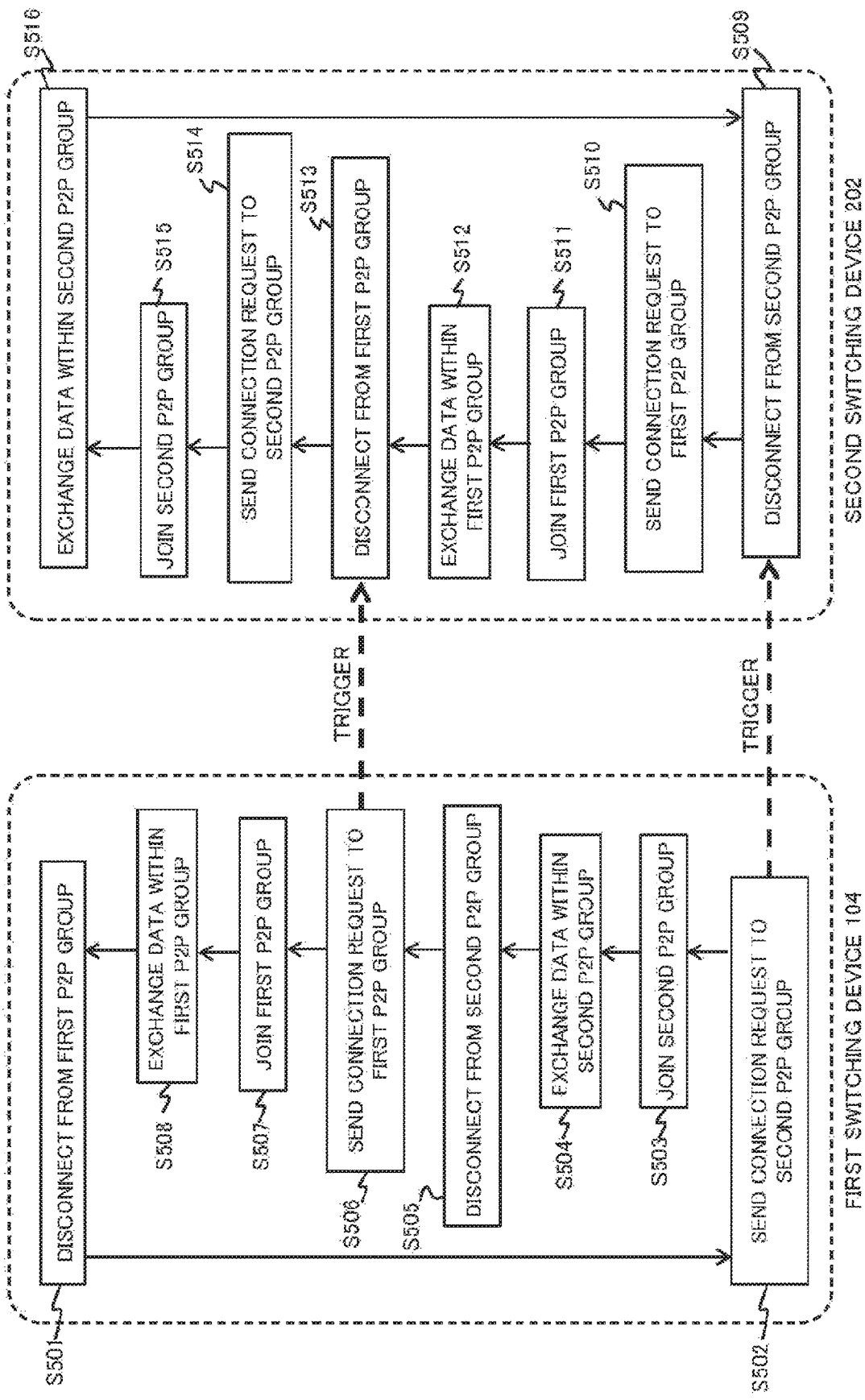
FIG. 12 is a flowchart showing the sequence of events at the triggering and triggering switching devices according to the first exemplary embodiment of the present invention.

Referring to FIG. 12, the node 104 disconnects from the first P2P group as shown in event S501 and sends a connection request to the group owner device 201 of the second P2P group 20 as shown in event S502. The connection request in event S502 acts as the trigger to initiate the event (S509) in the node 202. In the event S509, the node 202 disconnects from the second P2P group 20. Following this, the node 104 joins the second P2P group 20 as shown in event S503. The node 202 sends a connection request to the group owner device 101 of the first P2P group 10 as shown in event S510 and joins the first P2P group 10 as shown in event S511. The node 202 may participate in data communication with at least one node within the second P2P group 20 as shown in event S504. Similarly, the node 202 may participate in data communication with at least one node within the first P2P group 10 as shown in event S512. Following the event S504, the node 104 disconnects from the second P2P group 20 as shown in event S505 and sends a connection request to the group owner device 101 of the first P2P group 10 as shown in event S506. The event S506 will trigger the event S513. In the event S513, the node 202 disconnects from the first P2P group 10. Following the event S513, the node 202 sends a connection request to the group owner device 201 of the second P2P group 20 as shown in event S514 and subsequently joins the second P2P group 20 as shown in event S515. The node 104 also joins the first P2P group 10 as shown in event S507. Then, the node 104 may participate in communication with at least one node within the first P2P group 10 as shown in event S508. Similarly, the node 202 may participate in communication with at least one node within the second P2P group 20 as shown in event S516. The process may repeat iteratively for communication between the first P2P group 10 and the second P2P group 20.

As described above, the first switching device 104 triggers the switching event of the second switching device 202. Thus the first switching device 104 acts as the triggering device and the second switching device 202 acts as the triggered device, resulting in synchronization between the first and second switching devices.

4. Second Exemplary Embodiment

Figure 13:
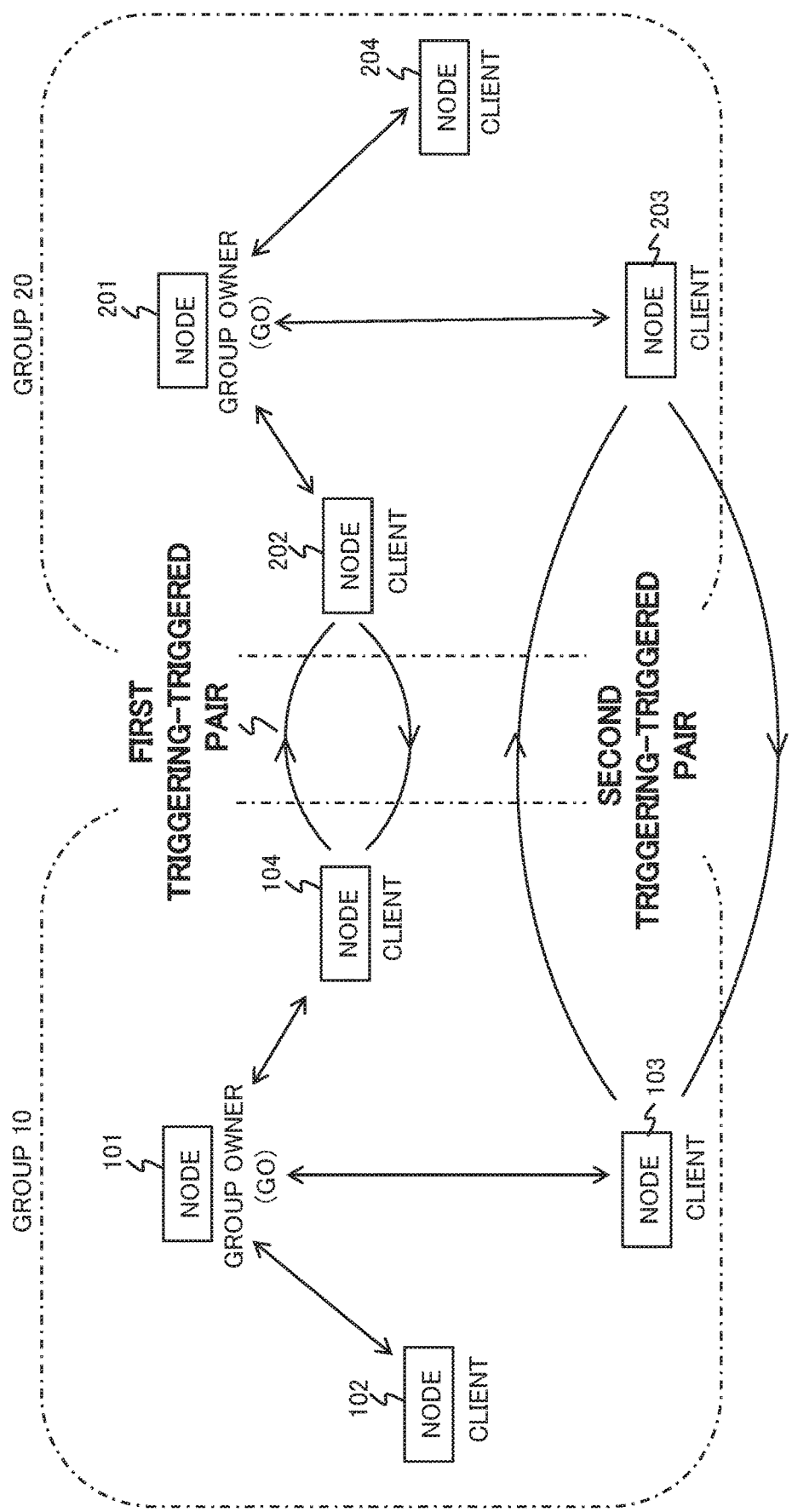
FIG. 13 is a diagram showing multiple pairs of triggering and triggered switching devices between a first P2P group and a second P2P group according to a second exemplary embodiment of the present invention.

FIG. 13 shows an example concerning two Wi-Fi P2P groups 10 and 20 operating in each other's transmission range. The node 101 is the P2P GO of the group 10. The nodes 102-104 are P2P Clients of the group 10 connected to the P2P GO 101. The node 201 is the P2P GO of the group 20. The nodes 202-204 are P2P Clients of the group 20 connected to the P2P GO 201. This example illustrates a mechanism of two triggering-triggered pairs of switching devices. The node 104 of the P2P group 10 and the node 202 of the P2P group 20 form a triggering-triggered pair of switching devices and operate in a fashion similar to the description in FIG. 12. Similarly, the node 103 of the P2P group 10 and the node 203 of the P2P group 20 form another triggering-triggered pair of switching devices and also operate in a fashion similar to the description in FIG. 12. There can be multiple such triggering-triggered pairs of switching devices between a first P2P group and a second P2P group.

Figure 14:
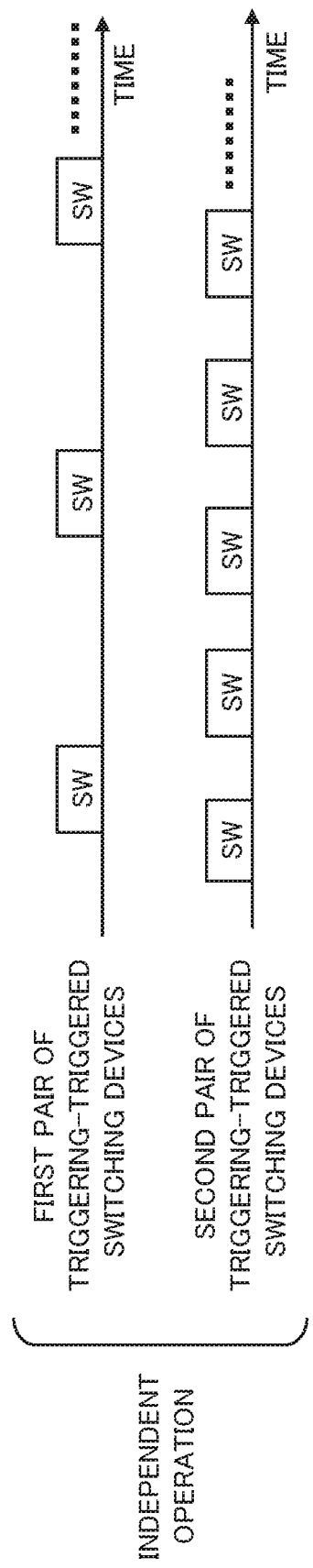
FIG. 14 is a diagram illustrating an independent operation of first and second pairs of triggering and triggered switching devices according to the second exemplary embodiment of the present invention.

As shown in FIG. 14, each such pair of triggering-triggered switching devices may operate independently. Thus, a first pair of triggering-triggered switching devices may perform switching between the first and second P2P groups 10 and 20 at a specific switching frequency and a second pair of triggering-triggered switching devices may perform switching at a different switching frequency. The switching frequency is represented by the number of switching events happening per unit interval of time.

5. Third Exemplary Embodiment

Figure 15:
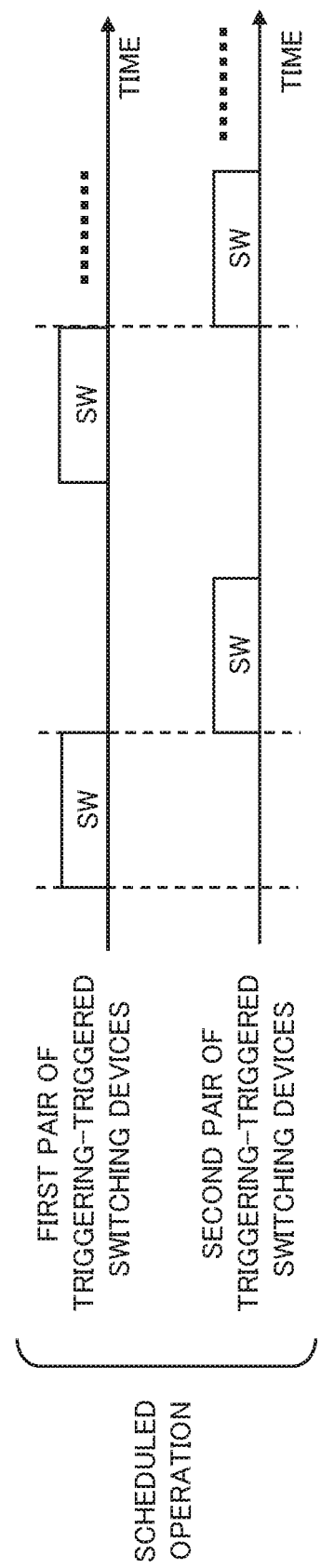
FIG. 15 is a diagram illustrating a scheduled operation of first and second pairs of triggering and triggered switching devices according to a third exemplary embodiment of the present invention.

In the network configuration as shown in FIG. 13, multiple triggering-triggered pairs may operate according to a pre-defined schedule or as instructed by a group owner device which is one of the first or second P2P groups 10 and 20. For example, as shown in FIG. 15, a first pair of triggering-triggered switching devices performs one switching event (SW) and a second pair of triggering-triggered switching devices is instructed to perform the next switching event between the first and second P2P groups 10 and 20. Thus, a first triggering-triggered pair (nodes 104 and 202) and a second triggering-triggered pair (nodes 103 and 203) may perform switching in an alternate fashion between the first and second P2P groups 10 and 20.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as computer programs executed by the device and may be stored on one or more computer readable mediums. It is also contemplated that the steps identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, the word "device" and "node" have been interchangeably used and may define Group Owner, Client, or P2P device connectable to a group but not connected to any group. It may also be noted that the application of the present invention to any other peer-to-peer or device-to-device communication technologies should be included well within the spirit and scope of the present disclosure as hereinafter claimed.

It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

The above exemplary embodiments can be applied to wireless peer-to-peer (P2P) networks.

6. Supplementary Notes

The whole or part of the exemplary embodiments disclosed above can be described as, but not limited to, the following supplementary notes.

(Supplementary Note 1)

A method of operating a wireless peer-to-peer (P2P) network including a plurality of P2P groups, comprising:

disconnecting a first device included in a first P2P group from the first P2P group so that the first device joins to a second P2P group; and in synchronization with the first device switching to the second P2P group, disconnecting a second device included in the second P2P group from the second P2P group so that the second device joins to the first P2P group.

(Supplementary Note 2)

The method according to supplementary note 1, wherein the first device triggers the second device to initiate switching between the first and second P2P groups.

(Supplementary Note 3)

The method according to supplementary note 1 or 2, further comprising:

exchanging data between the first device and the second P2P group and between the second device and the first P2P group;

after a predetermined time interval has elapsed, disconnecting the first device from the second P2P group so that the first device joins back to the first P2P group; and in synchronization with the first device switching to the first P2P group, disconnecting the second device from the first P2P group so that the second device joins back to the second P2P group.

(Supplementary Note 4)

The method according to any one of supplementary notes 1-3, wherein the number of switching events between the first and second P2P groups per unit interval of time is varied by controlling the first device.

(Supplementary Note 5)

The method according to any one of supplementary notes 1-4, wherein a plurality of pairs of triggering device and triggered device perform switching between the first and second P2P groups, each of the pairs operating like a pair of the first and second devices.

(Supplementary Note 6)

The method according to supplementary note 5, wherein the pairs perform the switching independent of each other or as scheduled.

(Supplementary Note 7)

The method according to supplementary note 6, wherein the pairs perform the switching at different switching frequencies and/or one after another.

(Supplementary Note 8)

The method according to any one of supplementary notes 1-7, wherein the first device shares a credential of the first P2P group with the second P2P group such that the second device is allowed to use the credential to join the first P2P group.

(Supplementary Note 9)

The method according to any one of supplementary notes 1-7, wherein at least one of the first device and the second device re-uses at least one credential of at least one previous connection for switching connection between the first P2P group and the second P2P group.

(Supplementary Note 10)

The method according to any one of supplementary notes 1-9, wherein at least one of the first switching device and the second switching device is chosen according to a criterion such that the chosen device of one group is at least one of:

a device that receives highest Received Signal Strength Indicator (RSSI) from the group owner of the other group;

a device that meets at least one of predefined criteria on memory, CPU speed, residual power, and time to stay in the wireless P2P network;

a device that has minimum average packet exchange (packet sending and receiving) among all devices in the one group over an interval of time; and a device not performing switching with any other neighboring group.

(Supplementary Note 11)

The method according to any one of supplementary notes 1-10, wherein at least one of the first switching device and the second switching device includes information in at least one of a connection request and an invitation request sent to a group owner of the other group so as to enable the group owner of the other group to know that the connection request is for inter-group communication based on switching.

(Supplementary Note 12)

The method according to any one of supplementary notes 1-10, wherein, at least one of the first group owner node and the second group owner node shares information about impending inter-group communication with the other group owner based on switching using unicast, multicast or broadcast mechanism.

(Supplementary Note 13)

The method according to supplementary note 11 or 12, wherein the information comprises at least one of:

at least one of a flag bit, a character, a string and a number;

an identification number of the native group; and an identification number of the group owner node of the native group.

(Supplementary Note 14)

The method according to any one of supplementary notes 11-13, wherein the information is included in a vendor specific attribute field of at least one of the connection request and the invitation request from at least one of the first switching device and second switching device.

(Supplementary Note 15)

The method according to any one of supplementary notes 1-14, wherein at least one of the first device and second device supports Wi-Fi Direct capability and each P2P group is a Wi-Fi Direct group.

(Supplementary Note 16)

A system for operating a wireless peer-to-peer (P2P) network including a plurality of P2P groups, wherein a first device included in a first P2P group disconnects from the first P2P group so that the first device joins to a second P2P group; and a second device included in the second P2P group, in synchronization with the first device switching to the second P2P group, disconnects from the second P2P group so that the second device joins to the first P2P group.

(Supplementary Note 17)

The system according to supplementary note 10, wherein the first device triggers the second device to initiate switching between the first and second P2P groups.

(Supplementary Note 18)

The system according to supplementary note 16 or 17, wherein the first device exchanges data with the second P2P group and the second device exchanges data with the first P2P group;

after a predetermined time interval has elapsed, the first device disconnects from the second P2P group so that the first device joins back to the first P2P group; and the second device, in synchronization with the first device switching to the firsts P2P group, disconnects from the first P2P group so that the second device joins back to the second P2P group.

(Supplementary Note 19)

The system according to any one of supplementary notes 16-18, wherein the number of switching between the first and second P2P groups per unit interval of time is varied by controlling the first device.

(Supplementary Note 20)

The system according to any one of supplementary notes 16-19, wherein a plurality of pairs of triggering device and triggered device perform switching between the first and second P2P groups, each of the pairs operating like a pair of the first and second devices.

(Supplementary Note 21)

The system according to supplementary note 20, wherein the pairs perform the switching independent of each other or as scheduled.

(Supplementary Note 22)

The system according to supplementary note 21, wherein the pairs perform the switching at different frequencies and/or one after another.

(Supplementary Note 23)

The system according to any one of supplementary notes 16-22, wherein the first device shares a credential of the first P2P group with the second P2P group such that the second device is allowed to use the credential to join the first P2P group.

(Supplementary Note 24)

The system according to any one of supplementary notes 16-22, wherein at least one of the first device and the second device re-uses at least one credential of at least one previous connection for switching connection between the first P2P group and the second P2P group.

(Supplementary Note 25)

The system according to any one of supplementary notes 16-24, wherein at least one of the first switching device and the second switching device is chosen according to a criterion such that the chosen device of one group is at least one of:

a device that receives highest Received Signal Strength Indicator (RSSI) from the group owner of the other group;

a device that meets at least one of predefined criteria on memory, CPU speed, residual power, and time to stay in the wireless P2P network;

a device that has minimum average packet exchange (packet sending and receiving) among all devices in the one group over an interval of time, and a device that is not performing switching with any other neighboring group.

(Supplementary Note 26)

The system according to any one of supplementary notes 16-25, wherein at least one of the first switching device and the second switching device includes information in at least one of a connection request and an invitation request sent to a group owner of the other group so as to enable the group owner of the other group to know that the connection request is for inter-group communication based on switching.

(Supplementary Note 27)

The system according to any one of supplementary notes 16-25, wherein, at least one of the first group owner node and the second group owner node shares information about impending inter-group communication with the other group owner based on switching using unicast, multicast or broadcast mechanism.

(Supplementary Note 28)

The system according to supplementary note 26 or 27, wherein the information comprises at least one of:

at least one of a flag bit, a character, a string and a number;

an identification number of the native group; and an identification number of the group owner node of the native group.

(Supplementary Note 29)

The system according to any one of supplementary notes 26-28, wherein the information is included in a vendor specific attribute field of at least one of the connection request and the invitation request from at least one of the first switching device and second switching device.

(Supplementary Note 30)

The system according to any one of supplementary notes 16-29, wherein at least one of the first device and second device supports Wi-Fi Direct capability and each P2P group is a Wi-Fi Direct group.

(Supplementary Note 31)

A device operating in one of a plurality of peer-to-peer (P2P) groups included in a wireless P2P network, comprising:

a controller that is configured to disconnect from a first P2P group in response to reception of an instruction from a first group owner of the first P2P group; and a communication controller that is configured to send a connection request as a trigger for inter-group communication to a second group owner of a second P2P group so as to join to the second P2P group, wherein the second group owner instructs a device included in the second P2P group to initiate connection switching from the second P2P group to the first P2P group in synchronization with the trigger.

(Supplementary Note 32)

A device operating in one of a plurality of peer-to-peer (P2P) groups included in a wireless P2P network, wherein another device included in a first P2P group receives an instruction from a first group owner of the first P2P group, the device comprising:

a controller that is configured to disconnect from a second P2P group in response to reception of an instruction from a second group owner of the second P2P group, wherein the second group owner has received a connection request as a trigger from the another device; and a communication controller that is configured to send a connection request to the first group owner of the first P2P group so as to switch its connection from the second P2P group to the first P2P group.

(Supplementary Note 33)

A non-transitory computer readable medium embodying instructions for controlling a device to implement a method comprising:

disconnecting from a first P2P group in response to reception of an instruction from a first group owner of the first P2P group; and sending a connection request as a trigger for inter-group communication to a second group owner of a second P2P group so as to join to the second P2P group, wherein the second group owner instructs a device included in the second P2P group to initiate connection switching from the second P2P group to the first P2P group in synchronization with the trigger.

(Supplementary Note 34)

A non-transitory computer readable medium embodying instructions for controlling a device to implement a method comprising:

disconnecting from a second P2P group in response to reception of an instruction from a second group owner of the second P2P group, wherein the second group owner has received a connection request as a trigger from the another device; and sending a connection request to the first group owner of the first P2P group so as to switch its connection from the second P2P group to the first P2P group.

REFERENCE SIGNS LIST 10, 20 P2P group
101-104, 201-204 Node (device)
201 Radio system 202 User controller
203 Processor
204 Memory

What is claimed is:

1. A method of operating a wireless peer-to-peer (P2P) network including a plurality of P2P groups, comprising:
    disconnecting a first device included in a first P2P group from the first P2P group and connecting with a second P2P group owner so that the first device joins to a second P2P group;
    in synchronization with the first device switching to the second P2P group, disconnecting a second device included in the second P2P group from the second P2P group and connecting with the first P2P owner so that the second device joins to the first P2P group,
    exchanging data between the first device and the second P2P group and between the second device and the first P2P group;
    after a predetermined time interval has elapsed, disconnecting the first device from the second P2P group so that the first device joins back to the first P2P group; and
    in synchronization with the first device switching to the first P2P group, disconnecting the second device from the first P2P group so that the second device joins back to the second P2P group.

2. The method according to claim 1, wherein the first device triggers the second device to initiate switching between the first and second P2P groups.

3. The method according to any one of claim 1, wherein the number of switching events between the first and second P2P groups per unit interval of time is varied by controlling the first device.

4. The method according to claim 1, wherein a plurality of pairs of triggering device and triggered device perform switching between the first and second P2P groups, each of the pairs operating like a pair of the first and second devices.

5. The method according to claim 4, wherein the pairs perform the switching independent of each other or as scheduled.

6. The method according to claim 5, wherein the pairs perform the switching at different switching frequencies and/or one after another.

7. The method according to claim 1, wherein the first device shares a credential of the first P2P group with the second P2P group such that the second device is allowed to use the credential to join the first P2P group.

8. The method according to claim 7, wherein at least one of the first device and the second device re-uses at least one credential of at least one previous connection for switching connection between the first P2P group and the second P2P group.

9. The method according to claim 1, wherein at least one of the first switching device and the second switching device is chosen according to a criterion such that the chosen device of one group is at least one of:
    a device that receives highest Received Signal Strength Indicator (RSSI) from the group owner of the other group;
    a device that meets at least one of predefined criteria on memory, CPU speed, residual power, and time to stay in the wireless P2P network;
    a device that has minimum average packet exchange (packet sending and receiving) among all devices in the one group over an interval of time; and
    a device not performing switching with any other neighboring group.

10. The method according to claim 1, wherein at least one of the first switching device and the second switching device includes information in at least one of a connection request and an invitation request sent to a group owner of the other group so as to enable the group owner of the other group to know that the connection request is for inter-group communication based on switching.

11. The method according to claim 1, wherein, at least one of the first group owner node and the second group owner node shares information about impending inter-group communication with the other group owner based on switching using unicast, multicast or broadcast mechanism.

12. The method according to claim 10, wherein the information comprises at least one of:
    at least one of a flag bit, a character, a string and a number;
    an identification number of the native group; and
    an identification number of the group owner node of the native group.

13. The method according to claim 10, wherein the information is included in a vendor specific attribute field of at least one of the connection request and the invitation request from at least one of the first switching device and second switching device.

14. The method according to claim 1, wherein at least one of the first device and second device supports Wi-Fi Direct capability and each P2P group is a Wi-Fi Direct group.

15. A first device operating in one of a plurality of peer-to-peer (P2P) groups included in a wireless P2P network, the first device comprising:
    a memory storing a set of instructions for performing inter-group communication; and
    a processor configured to execute the set of instructions to:
        disconnect from a first P2P group in response to reception of an instruction from a first group owner of the first P2P group;
        send a connection request as a trigger for inter-group communication to a second group owner of a second P2P group so as to join to the second P2P group,
        wherein the second group owner instructs a second device included in the second P2P group to initiate connection switching from the second P2P group to the first P2P group in synchronization with the trigger;
        exchange data between the first device and the second P2P group; and
        after a predetermined time interval has elapsed, disconnect the first device from the second P2P group so that the first device joins back to the first P2P group,
    wherein in synchronization with the first device switching to the first P2P group, the second device disconnects from the first P2P group so that the second device joins back to the second P2P group.

16. A second device operating in one of a plurality of peer-to-peer (P2P) groups included in a wireless P2P network, wherein a first device included in a first P2P group receives an instruction from a first group owner of the first P2P group, the second device comprising:
    a memory storing a set of instructions for performing inter-group communication; and
    a processor configured to execute the set of instructions to:
        disconnect from a second P2P group in response to reception of an instruction from a second group owner of the second P2P group, wherein the second group owner has received a connection request as a trigger from the first device; and send a connection request to the first group owner of the first P2P group so as to switch its connection from the second P2P group to the first P2P group;

exchange data between the second device and the first P2P group; and after a predetermined time interval has elapsed, disconnect the second device from the first P2P group so that the second device joins back to the second P2P group, wherein in synchronization with the second device switching to the second P2P group, the first device disconnects from the second P2P group so that the first device joins back to the first P2P group.

17. A non-transitory computer readable medium storing a program that comprises instructions for a first device to perform:

disconnecting from a first P2P group in response to reception of an instruction from a first group owner of the first P2P group; and sending a connection request as a trigger for inter-group communication to a second group owner of a second P2P group so as to join to the second P2P group, wherein the second group owner instructs a second device included in the second P2P group to initiate connection switching from the second P2P group to the first P2P group in synchronization with the trigger;

exchanging data between the first device and the second P2P group; and after a predetermined time interval has elapsed, disconnecting the first device from the second P2P group so that the first device joins back to the first P2P group, wherein in synchronization with the first device switching to the first P2P group, the second device disconnects from the first P2P group so that the second device joins back to the second P2P group.

18. A non-transitory computer readable medium storing a program that comprises instructions for a second device to perform:

disconnecting from a second P2P group in response to reception of an instruction from a second group owner of the second P2P group, wherein the second group owner has received a connection request as a trigger from a first device; and sending a connection request to the first group owner of the first P2P group so as to switch its connection from the second P2P group to the first P2P group;

exchanging data between the second device and the first P2P group; and after a predetermined time interval has elapsed, disconnecting the second device from the first P2P group so that the second device joins back to the second P2P group, wherein in synchronization with the second device switching to the second P2P group, the first device disconnects from the second P2P group so that the first device joins back to the first P2P group.

* * * * *